(12) United States Patent
Zheng et al.

(10) Patent No.: US 11,348,614 B2
(45) Date of Patent: May 31, 2022

(54) HOLOGRAPHIC STORAGE METHOD AND DEVICE BASED ON ANGLE-SHIFT MULTIPLEXING

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/152,466

(22) Filed: Jan. 19, 2021

(65) Prior Publication Data

US 2021/0225402 A1   Jul. 22, 2021

(30) Foreign Application Priority Data

Jan. 21, 2020   (CN) .......................... 202010070660.2

(51) Int. Cl.
  *G11B 7/0065*   (2006.01)
  *G11B 7/127*    (2012.01)
(52) U.S. Cl.
  CPC ............ *G11B 7/0065* (2013.01); *G11B 7/127* (2013.01)
(58) Field of Classification Search
  None
  See application file for complete search history.

(56) References Cited

U.S. PATENT DOCUMENTS

| 5,438,439 | A | * | 8/1995 | Mok | G03H 1/26 |
| | | | | | 359/10 |
| 7,187,481 | B1 | * | 3/2007 | Sigel | G03H 1/20 |
| | | | | | 359/10 |
| 2002/0051419 | A1 | * | 5/2002 | Itoh | G03H 1/2286 |
| | | | | | 369/103 |
| 2002/0075776 | A1 | * | 6/2002 | Kasazumi | G11B 7/1374 |
| | | | | | 369/47.5 |
| 2005/0185231 | A1 | * | 8/2005 | Chuang | G11B 7/007 |
| | | | | | 359/3 |

(Continued)

*Primary Examiner* — Peter Vincent Agustin
(74) *Attorney, Agent, or Firm* — Muncy, Geissler, Olds & Lowe, P.C.

(57) ABSTRACT

The invention discloses a holographic multiplex recording method, which combines technical advantages of angle multiplexing and shift multiplexing, and improves capacity and stability of a system. A medium contracts and expands due to environmental temperature fluctuations, which causes broken Bragg condition. However, the angle multiplexing has the advantages that the broken Bragg condition caused by contraction and expansion of the medium can be corrected by controlling an incident angle of a reference beam and an emitting wavelength of a laser, and the problem of a weak reproduction signal caused by the environmental temperature fluctuations is solved. On the other hand, the advantages of shift multiplex recording are that cross-write noise is not accumulated and that a multiplexing number can be improved by using a cross-shift multiplex method. According to the present invention, a large-capacity recording device with high stability is realized by combining the two technologies.

16 Claims, 11 Drawing Sheets

(56) References Cited

U.S. PATENT DOCUMENTS

| | | | | |
|---|---|---|---|---|
| 2005/0264860 A1* | 12/2005 | Toishi | .................. | G11B 7/0065 |
| | | | | 359/22 |
| 2005/0270609 A1* | 12/2005 | Chuang | ................... | G11B 7/28 |
| | | | | 359/22 |
| 2006/0039047 A1* | 2/2006 | Someno | ................... | G03H 1/26 |
| | | | | 359/24 |
| 2008/0037085 A1* | 2/2008 | Gabor | .................. | G11B 7/1381 |
| | | | | 359/24 |
| 2009/0161519 A1* | 6/2009 | Yamamoto | ........... | G11B 7/0065 |
| | | | | 369/103 |
| 2021/0225402 A1* | 7/2021 | Zheng | .................... | G11B 7/127 |
| 2021/0233568 A1* | 7/2021 | Zheng | ..................... | G11B 7/14 |

* cited by examiner

HOLOGRAPHIC STORAGE METHOD AND DEVICE BASED ON ANGLE-SHIFT MULTIPLEXING

CROSS REFERENCE TO RELATED APPLICATIONS

The present application claims priority from Chinese Patent Application No. 202010070660.2 filed on Jan. 21, 2020, all of which are hereby incorporated herein by reference.

TECHNICAL FIELD

The invention belongs to the technical field of optical holographic storage, in particular to a holographic storage method and device based on angle-shift multiplexing.

BACKGROUND ART

A reference light used by an angle multiplex recording method is a plane wave, and multiplexing/recording is achieved by changing an incident angle of a reference light. According to the method, a hologram cannot be reproduced just by changing the incident angle of the reference light by about 0.1 degree, so that a new hologram can be recorded at this angle, and the above is repeated multiple times for a multiplexed recording of about 100 times. In this method, angle selectivity is determined by the Bragg condition. Since the intensity of a reproduction light is quite sensitive to angle change, a reproduction light intensity is greatly reduced when the angle change is 0.1 degree. However, since an incident position of a signal light is not changed, cross-write noise is accumulated with a multiplex process, and a signal-to-noise ratio is lowered. Further, a variation range of the incident angle is limited, so that it is impossible to increase multiplex times without limit. Therefore, both accumulation of noise and the variation range of angle may limit storage capacity of a medium. In contrast, shift multiplex recording is not limited by these restrictions, and medium capacity can be greatly improved.

SUMMARY OF THE INVENTION

The present invention aims to overcome at least one of the deficiencies in the prior art, and provides a holographic storage method and device and storage medium so as to increase storage capacity of the storage medium.

The present invention first provides a holographic storage method based on angle-shift multiplexing, in which an incident angle of a reference light is in one-to-one correspondence with a position of the reference light.

The incident angle of the reference light is different between overlapping holograms in a recording block.

A recording/reproducing position is accessed through translation and rotation of a medium.

A crossing angle of 45 degrees or more is formed between hologram sequences of cross-shift multiplex recording for recording at each time.

A position and a crossing angle of a hologram during cross-shift multiplex recording/reproducing are determined by detecting a marker on a guide groove.

When the Bragg condition composed of a signal wave vector, a reference wave vector, and a grating vector is broken, it can be corrected by controlling the incident angle and an incident wavelength of the reference light.

The present invention also provides a holographic recording/reproducing device that is suitable for the above-mentioned method and combined with angle multiplexing and shift multiplexing.

The present invention also provides a holographic storage medium based on the angle-shift multiplexing, which is suitable for the above-mentioned method and device. Holographic information is stored in a storage medium in the form of unit, each unit includes a plurality of holographic image information in a regular manner of shift multiplexing, and holographic image information at different positions in the same unit corresponds to different grating vector angles when being stored.

The storage medium includes a plurality of units superposed with each other. In the two different units superposed with each other, two pieces of holographic image information corresponding to the same grating vector angle are staggered and non-overlapping.

The rule is that the shift multiplexing is performed along an x direction and a y direction perpendicular to the x direction. A shift step dx in the x direction is different from a shift step dy in the y direction. A size width of the holographic image information in the x direction is defined as Rx, the size width in the y direction is Ry, in which dx=Rx/n, dy=Ry/m, n and m are the number of times of the shift multiplexing of the holographic image information in the x direction and the y direction respectively, and a size of the unit is 2Rx×2Ry.

The storage medium includes a plurality of units superposed with each other in the x direction and/or y direction, and the size of a superposed region of two different units superposed with each other is no less than Rx and/or Ry.

The holographic image information is a circular holographic image, Rx=Ry=D, in which D is a diameter of the circular holographic image, the x direction is a shift multiplex direction in the same unit, and the y direction is perpendicular to the x direction, and dy>dx.

The size of the unit is 2D×2D, the storage medium includes a plurality of units superposed with each other in the x direction and/or y direction, and a superposed width is D.

The unit is continuously superposed with the superposed width D in the x direction to form a unit row.

The storage medium has a rectangular shape and stores parallel distributed unit rows.

The storage medium has a circular shape and a plurality of concentrically distributed storage rings, each storage ring includes at least a plurality of radially distributed unit rows, and an x direction in which the unit rows are radially distributed is defined as x1.

The storage ring further includes a plurality of unit rows with a certain angle between the x direction and x1 to achieve angle cross multiplexing, in which the x direction of these radially distributed unit rows is defined as xi, i=2, 3, 4 . . . .

The fixed angle is greater than 45 degrees.

The storage medium has a circular shape and at least one storage ring including six unit rows that have different x directions defined as x1, x2 . . . , and each two of which differ by 60 degrees.

According to the holographic storage method based on the angle-shift multiplexing, the specific process is that the incident angle of the reference light is in one-to-one correspondence with the writing position of the reference light on the storage medium during the writing process, and the one-to-one correspondence is achieved by changing the incidence angle of the reference light and the writing position of the reference light on the storage medium at the same time.

The reference light is divided into a plurality of sub-beams changing at an equal angle Δθ, and the writing position of the sub-beam on the storage medium changes at an equal distance dx, or the storage medium is moved to cause the writing position of the sub-beam on the storage medium to change at the equal distance dx; only one sub-beam is controlled to illuminate the storage medium for each writing, and dx is the shift step of the shift multiplexing.

In addition, n times of shift multiplexing are performed in the x direction as the shift multiplex direction to form a row having the size width of 2Rx, m times of shift multiplexing are performed in the y direction perpendicular to the x direction, the shift step is dy, the unit having a size of 2Rx×2Ry is formed, and the incident angles of the reference light at different writing positions in the unit are different.

The reference light is divided into a plurality of sub-beams changing at the equal angle Δθ, in which the sub-beams are arranged in a matrix. The sub-beams change at equal distances dx and dy in two mutually perpendicular x and y directions on the storage medium, or the storage medium is moved to cause the sub-beams to change at equal distances dx and dy in two mutually perpendicular directions on the storage medium. Only one sub-beam is controlled to illuminate the storage medium for each writing, and dx and dy are the shift steps of the shift multiplexing in horizontal and vertical directions respectively.

The reference light achieves a linear scanning illumination changing at an equal angle Δθ and changing at an equal distance dx on the writing position of the storage medium by using a galvanometer mirror.

The reference light achieves a matrix scanning illumination changing at an equal angle Δθ and changing at the equal distances dx and dy in two mutually perpendicular directions x and y on the storage medium by using a dual galvanometer mirror.

When the reference light completes a row of shift multiplex writing along the x direction, the storage medium is moved to cause the writing position of the reference light to return to an initial position in the x direction, and a distance of dy is shifted in the y direction, a new row is written, which are repeated until an entire matrix scanning illumination is completed.

During the writing process, a unit of 2Rx×2Ry is taken as a storage unit, the shift steps of the shift multiplexing in the units in horizontal and vertical directions are dx and dy respectively, and the incident angles of the reference light at different writing positions in the unit are different.

In this method, the size width of the holographic image information in the x direction is Rx, the size width in the y direction is Ry, dx=Rx/n, dy=Ry/m, and n and m are the numbers of shift multiplexing of the holographic image information in the x and y directions respectively.

In this method, unit superposition multiplexing is performed along the x direction and the y direction respectively in a square storage medium, in which the superposition width in the x direction is Rx, and the superposition width in the y direction is Ry.

In this method, unit superposition multiplexing and cross multiplexing are performed in a circular storage medium.

Firstly, the units are superposed and multiplexed in the x direction to form unit rows with a superposition width Rx, then the circular storage medium is rotated and the cross multiplexing of the unit rows is realized.

The present invention provides a holographic storage device based on angle-shift multiplexing, including a light source, a reference optical path, a signal optical path and a medium platform. The light emitted by the light source is divided to form a reference light transmitted along the reference optical path and a signal light transmitted along the signal optical path. The reference light interferes with the signal light on the storage medium supported by the medium platform to form holographic storage image information. The improvement is that the holographic storage device based on angle-shift multiplexing also includes a control mechanism for controlling the incident angle of the reference light, so that the incident angle of the reference light is in one-to-one correspondence with the writing position of the reference light on the storage medium.

The control mechanism is a beam splitter dividing the reference light into a plurality of sub-beams that change at the equal angle Δθ, and the beam splitter controls only one sub-beam to illuminate the storage medium for each writing.

The control mechanism is a beam splitter dividing the reference light into a plurality of sub-beams that change at the equal angle Δθ and are arranged in a matrix, and the beam splitter controls only one sub-beam to illuminate the storage medium for each writing.

The control mechanism reflects the reference light at the equal angle Δθ, and controls the reference light to realize a galvanometer-mirror structure capable of scanning at the equal distance dx on the storage medium.

The control mechanism also includes another galvanometer-mirror structure for achieving the shift multiplexing of the reference light in a vertical direction.

The medium platform further includes a translation mechanism for driving the storage medium to translate and achieving shift multiplexing and cross multiplexing.

The medium platform further includes a rotation mechanism for driving the storage medium to rotate and realizing the shift multiplexing on the storage medium.

Compared with the prior art, the beneficial effects of the present invention are as follows. The invention discloses a holographic multiplex recording method, which combines technical advantages of angle multiplexing and shift multiplexing, and improves capacity and stability of a system. The medium contracts and expands due to environmental temperature fluctuations, which causes broken Bragg condition. However, the angle multiplexing has the advantages that the broken Bragg condition caused by contraction and expansion of the medium can be corrected by controlling the incident angle of a reference beam and an emitting wavelength of a laser, and the problem of a weak reproduction signal caused by the environmental temperature fluctuations is solved. On the other hand, the advantages of shift multiplex recording are that cross-write noise is not accumulated and that a multiplexing number can be improved by using a cross-shift multiplexing method. According to the present invention, a large-capacity recording device with high stability is realized by combining the two technologies.

Reference numerals: 10: laser; 20: shutter (AOM); 30: polaroid; 40: anamorphic prism group; 50: polarizing beam splitter; 51: first polarizing beam splitter; 52: second polarizing beam splitter; 60: attenuator; 70: half-wave plate; 80: mirror; 81: first mirror; 82: second mirror; 90: galvanometer mirror; 100: beam expanding collimator; 101: first beam expanding collimator; 102: second beam expanding collimator; 110: spatial light modulator; 120: relay lens group; 130: Fourier lens; 131: first Fourier lens; 132: second Fourier lens; 140: holographic disk; 150: camera; 160: acousto-optic modulator (AOM) that can be replaced with the galvanometer mirror.

DETAILED DESCRIPTION

The drawings of the present invention are for illustration purpose only and are not intended to limit the present invention. Some components in the drawings may be omitted, enlarged, or reduced for better illustrating the embodiments, and sizes of these components do not represent sizes of actual products. For those skilled in the art, it will be understood that some known structures in the drawings and descriptions thereof may be omitted.

Embodiments

Figure 1:
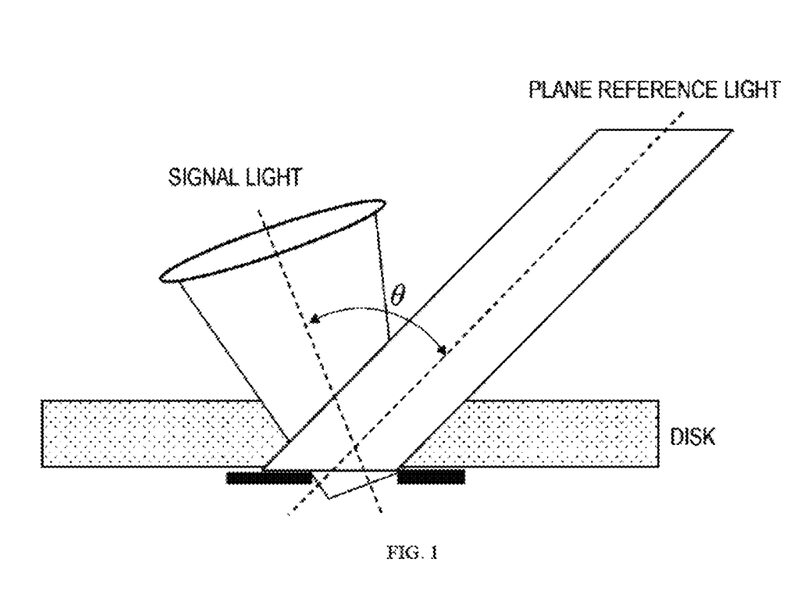
FIG. 1 is a principle diagram of angle multiplex recording.
Figure 2:
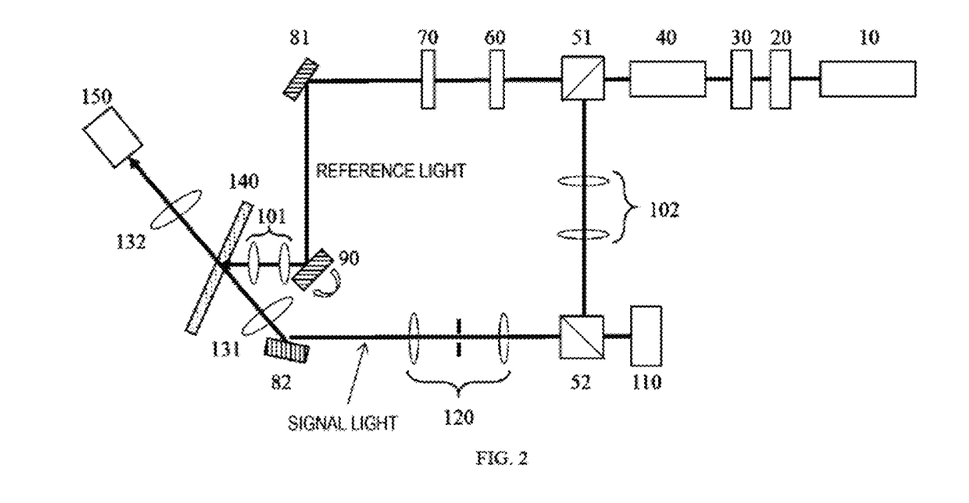
FIG. 2 is a structural diagram of an optical path system using an angle multiplex recording method.

As shown in FIG. 1, a traditional angle-multiplex recording method uses a plane wave as a reference light, and performs holographic multiplex recording on the same position of a medium while changing an incident angle. After a hologram is recorded a predetermined number of times, a next round of angle multiplex recording of the hologram is performed at another position that does not coincide with the above position. During reproduction, the medium is only illuminated with a reference beam, and a filter is used to prevent crosstalk from holograms in other positions. A typical angle-multiplexed holographic recording/reproducing device is shown in FIG. 2, in which the incident angle of the reference light is adjusted by a galvanometer mirror 90.

Figure 3:
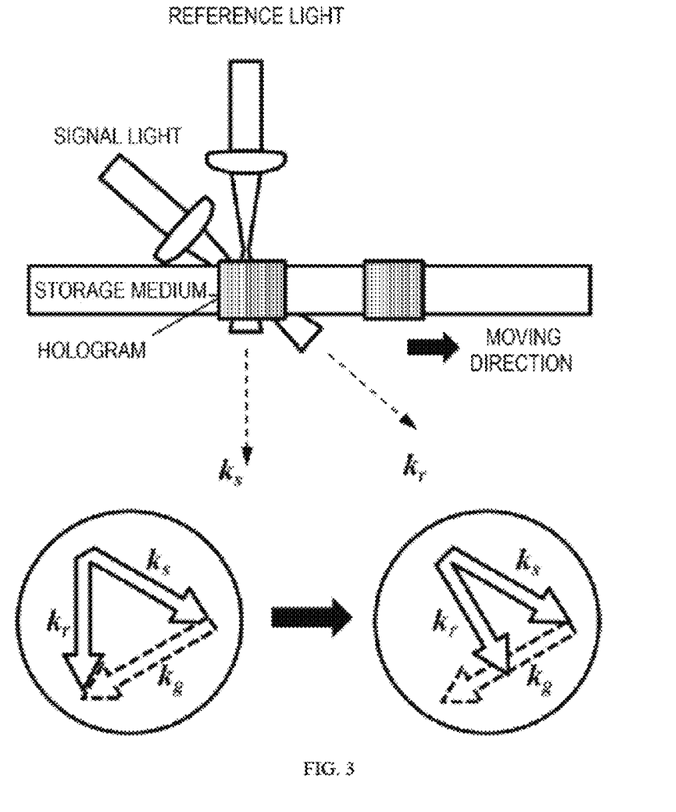
FIG. 3 is a principle diagram of shift multiplex recording.
Figure 4:
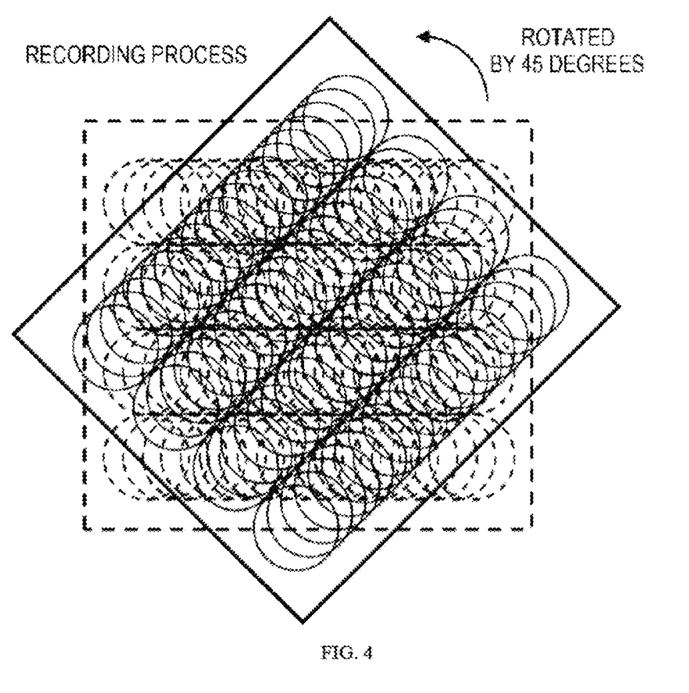
FIG. 4 is a principle diagram of cross-shift multiplex recording.

The principle of shift multiplex recording using a spherical wave as the reference light is shown in FIG. 3, which is a method of performing shift multiplex recording and reproducing the hologram using a spherical reference wave. The hologram cannot be reproduced by moving the medium a distance after recording the hologram, then a new hologram cannot be reproduced, that is, a new hologram can be re-recorded. Specifically, according to the Bragg principle, it can be known that a signal beam $k_s$, a reference beam $k_r$, and a grating vector $k_g$ jointly form a triangle, and the original triangle collapses and the hologram cannot be reproduced if the medium is moved by several microns. In this method, an intersecting line of a plane where optical axes of the reference light and a signal light are located and a medium surface is taken as an axis, and the medium is performed shift multiplexing in a direction of the axis. Shift selectivity in the axial direction is determined by the Bragg condition, and a shift distance of several microns can satisfy the condition. However, a diffracted intensity is not sensitive to the shift distance in a direction perpendicular to the axial direction, and it is difficult to increase storage density. FIG. 4 shows a cross-shift multiplex recording method associated with the present patent. According to the method, a two-dimensional hologram array is obtained by performing a shift multiplex recording in the axial direction, and then a coverage recording of a second shift multiplexing is performed by rotating the medium by a certain angle around a center normal line on the medium surface, which are repeated multiple times. This method is called cross-shift multiplex recording, which solves the problem that a multiplexing number is insufficient in a spherical wave shift multiplex recording method. Compared with an angle multiplexing method, a spherical wave reference light shift multiplexing method has a higher signal-to-noise ratio and a higher storage capacity.

In practical applications, as to holographic storage, the medium contracts and expands due to environmental temperature fluctuations, and at the same time, it is difficult to reproduce the hologram due to fluctuation of laser wavelength, and both of which degrade the signal quality. In this respect, the above two methods are compared.

Figure 5:
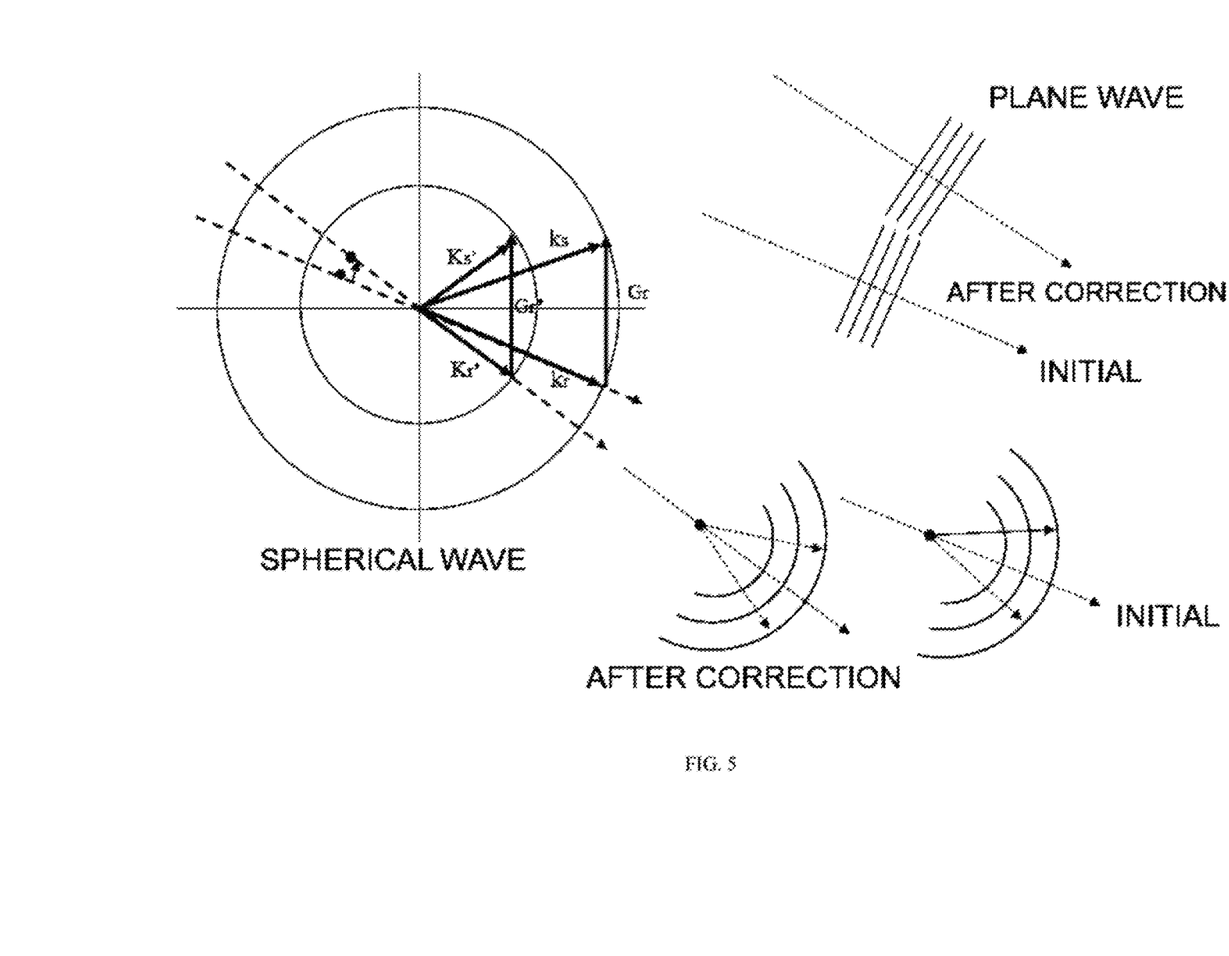
FIG. 5 is a correction method for medium shrinkage and wavelength fluctuation.

FIG. 5 depicts a correction method for medium shrinkage, wavelength fluctuation, and the like. $k_r$ is a reference wave vector, $k_s$ is a signal wave vector, $k_g$ is a grating vector, and the circle indicates the Ewald sphere changes caused by wavelength variation. As the wavelength increases, the radius of the Ewald sphere decreases. As a result, the $k_r$ direction that is optimal for reproduction of the hologram changes, and the diffraction efficiency of the hologram decreases. In contrast, angle multiplexing using a plane wave reference beam can easily resatisfy the Bragg condition by changing the incident angle of the reference beam. On the other hand, in the shift multiplexing using the spherical wave as the reference light, a wavefront is a superposition of sub-wavefronts propagating in multiple directions. As a result, even if an inclination angle of the reference light is changed, only partial optimization can be performed, and it becomes difficult to optimize all the $k_r$ directions. For this reason, it is basically impossible to restore the quality of a deteriorated signal, and a signal margin becomes small.

Figure 6:
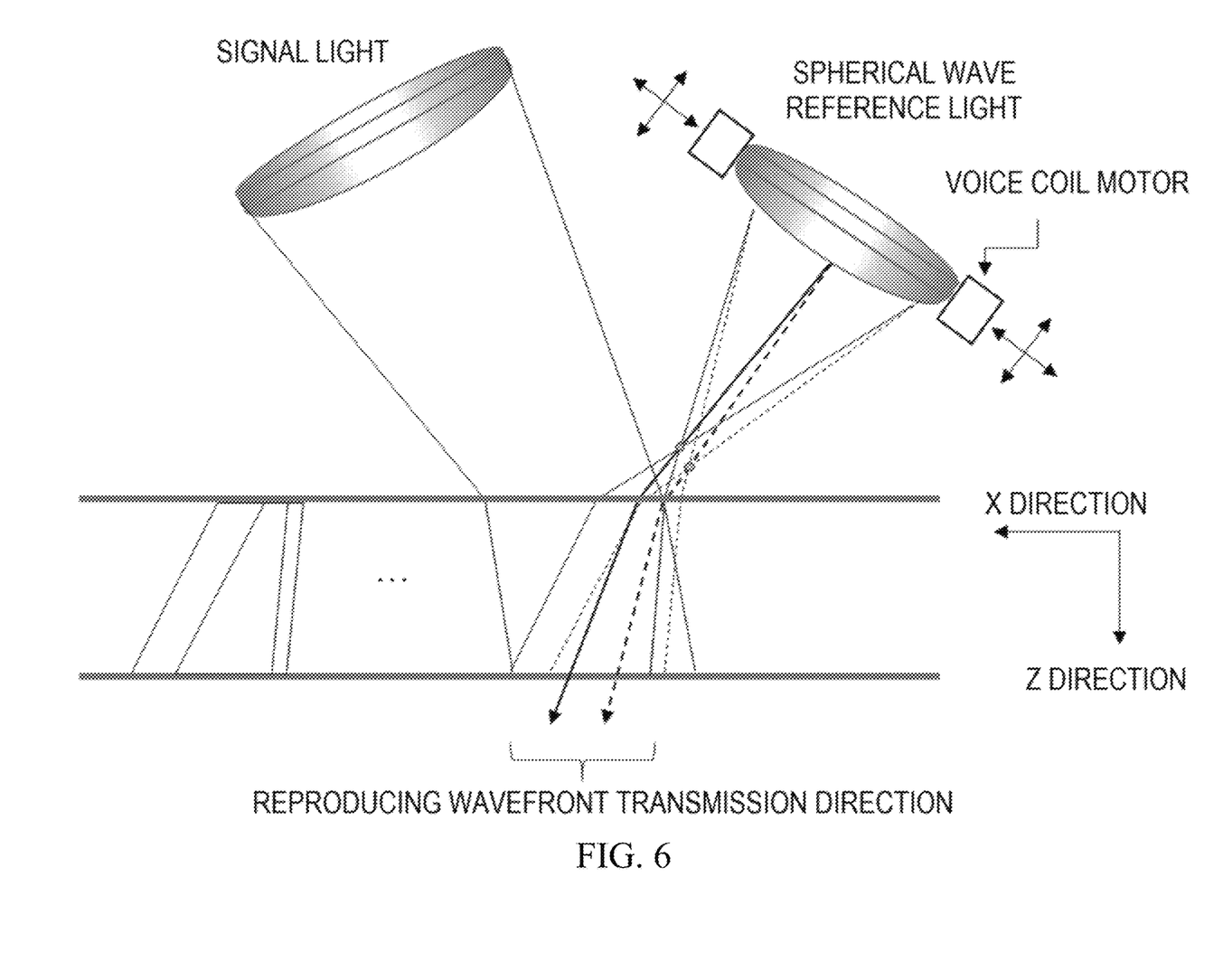
FIG. 6 is a schematic diagram of changing an incident angle of a reference light.

FIG. 6 shows a method for changing an optical axis of the spherical reference beam. The optical axis can be changed three-dimensionally by installing a lens on a motor. However, correction of all the $k_r$ directions in the reference beam is impossible theoretically. Therefore, the present patent establishes a large-capacity storage method capable of correcting the above cases by merging the angle multiplexing and the shift multiplexing as two methods having respective advantages.

Figure 7:
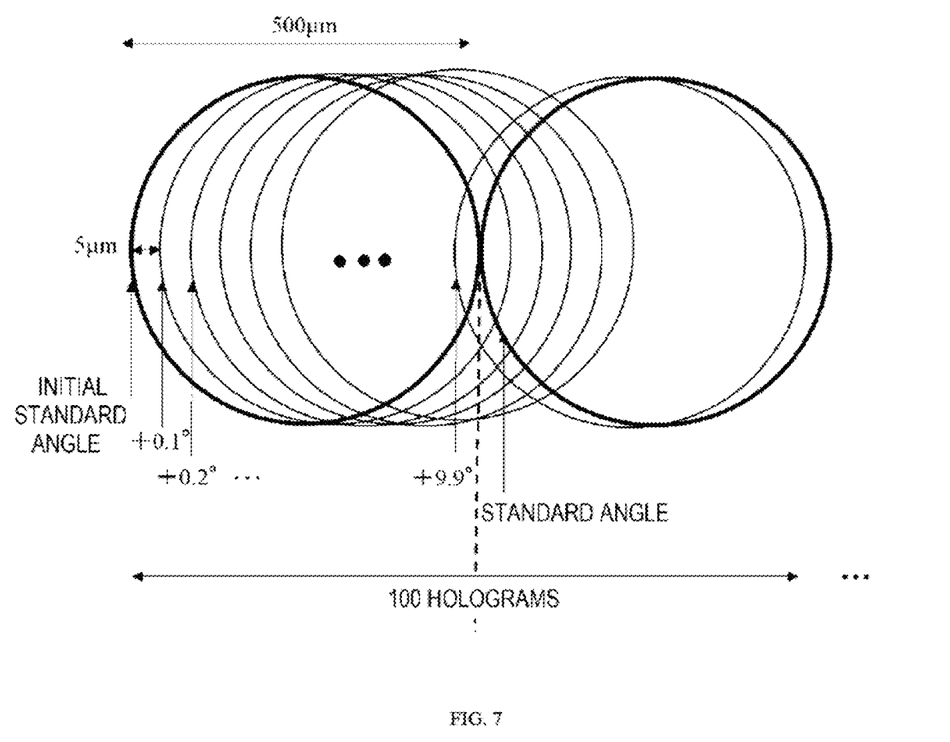
FIG. 7 is a schematic diagram of an angle-shift multiplex recording method.

The present invention discloses a method of recording shift multiplex recording by changing a reference beam angle. As shown in FIG. 7, the hologram is represented by circles with a diameter of 500 μm. A system light source uses a short pulse laser to record the hologram while moving the medium to the left. In the method proposed by the present patent, 800 multiplexing is assumed to be possible. As can be seen in FIG. 7, the holographic image information is a circular holographic image, that is, Rx=Ry=D=500 μm.

As shown in FIG. 7, the first hologram is recorded at a reference angle zero (first angle). Subsequently, one hologram is recorded with each 5 μm of movement while changing the angle of the reference beam by 0.1 degree, which are repeated multiple times, and 100 holograms are recorded. Since each hologram has a different reference light angle, crosstalk does not occur even when a plane wave is used as the reference light. This recording sequence is performed multiplex recording in the right direction in FIG. 7. In this hologram sequence, the hologram is recorded at a reference beam angle from 0 degree (first angle) to +9.9 degrees, and this form is continuously arranged in the right direction. That is, a shift step dx=5 μm in an x direction, the number of shift multiplexing of the holographic image information in the x direction n=100 times, and the reference light changes at an equal angle Δθ=0.1 degree in each multiplexing.

Figure 8:
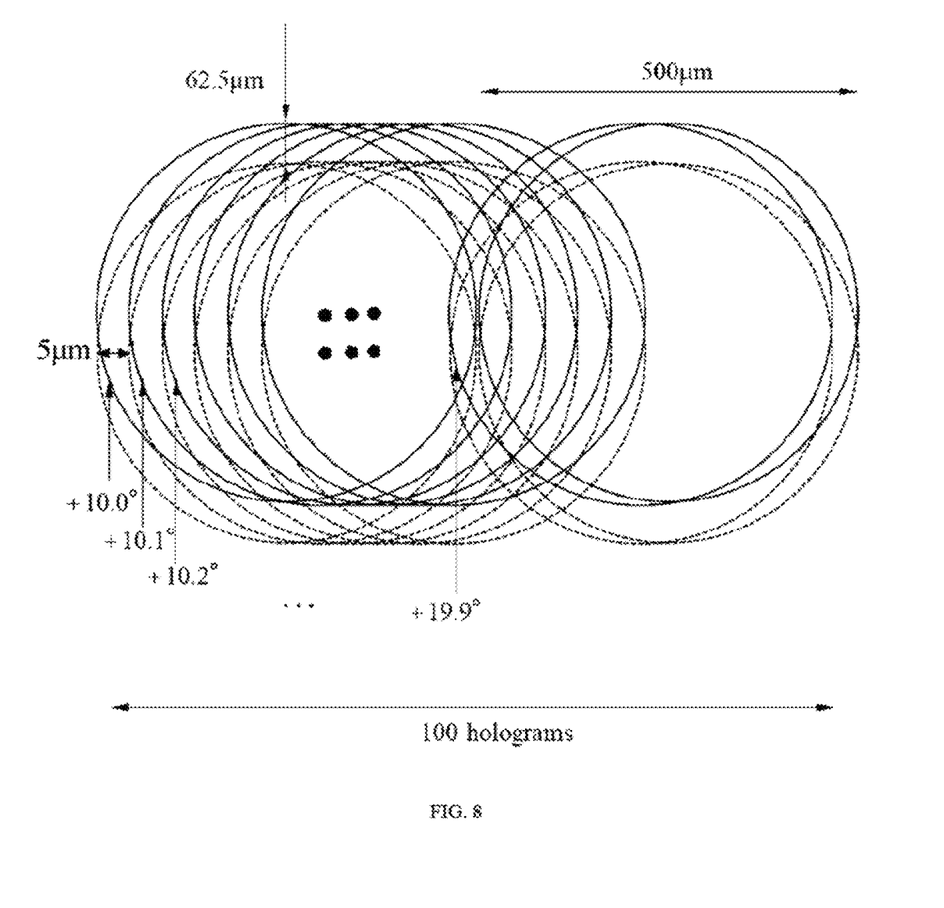
FIG. 8 is a schematic diagram of a two-dimensional recording method of angle-shift multiplexing.

FIG. 8 shows a two-dimensional recording method. As shown in FIG. 8, after continuous shift multiplexing in the right direction is performed using the method shown in FIG. 7, the storage medium is moved in a direction perpendicular to a medium shift direction, and then a second continuous shift multiplexing is repeated. Specifically, the incident angle of the reference light of a first hologram sequence (solid line) is 0 degree to +9.9 degrees. The center-to-center distance between a second hologram sequence (dotted line) and the first hologram sequence is 62.5 μm. The second hologram sequence also has 100 holograms, and the incident angle of the reference light varies from +10 degrees to +19.9 degrees. The above process is repeated, and a hologram recording unit composed of 8 hologram sequences can be obtained, and 800 multiplexing is achieved. That is, a shift step dy=62.5 μm in a y direction, the number of shift multiplexing of the holographic image information in the y direction m=8 times, and the reference light also changes at the equal angle Δθ=0.1 degree in each horizontal multiplexing. Starting angles of the reference light of two adjacent rows of hologram sequences differ by 10 degrees.

Figure 9:
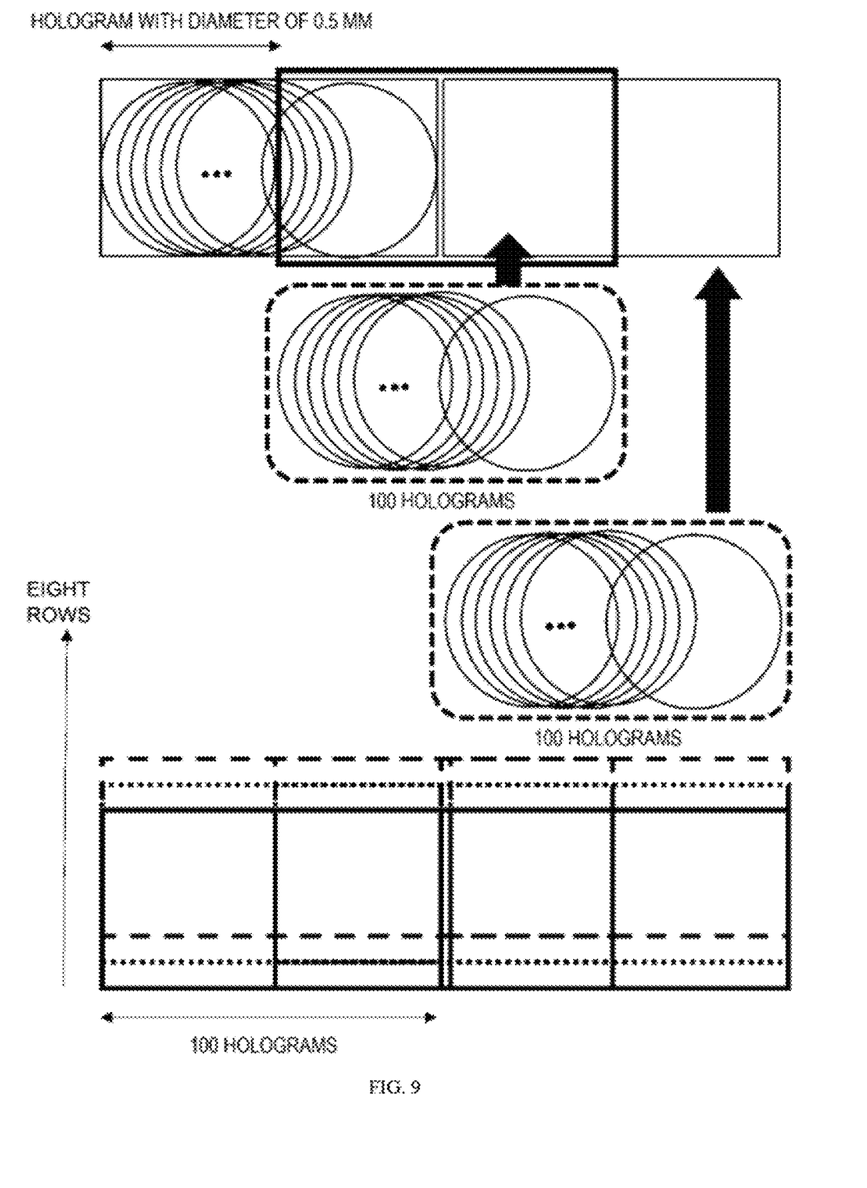
FIG. 9 is an overview of the angle-shift multiplex recording method.
Figure 10:
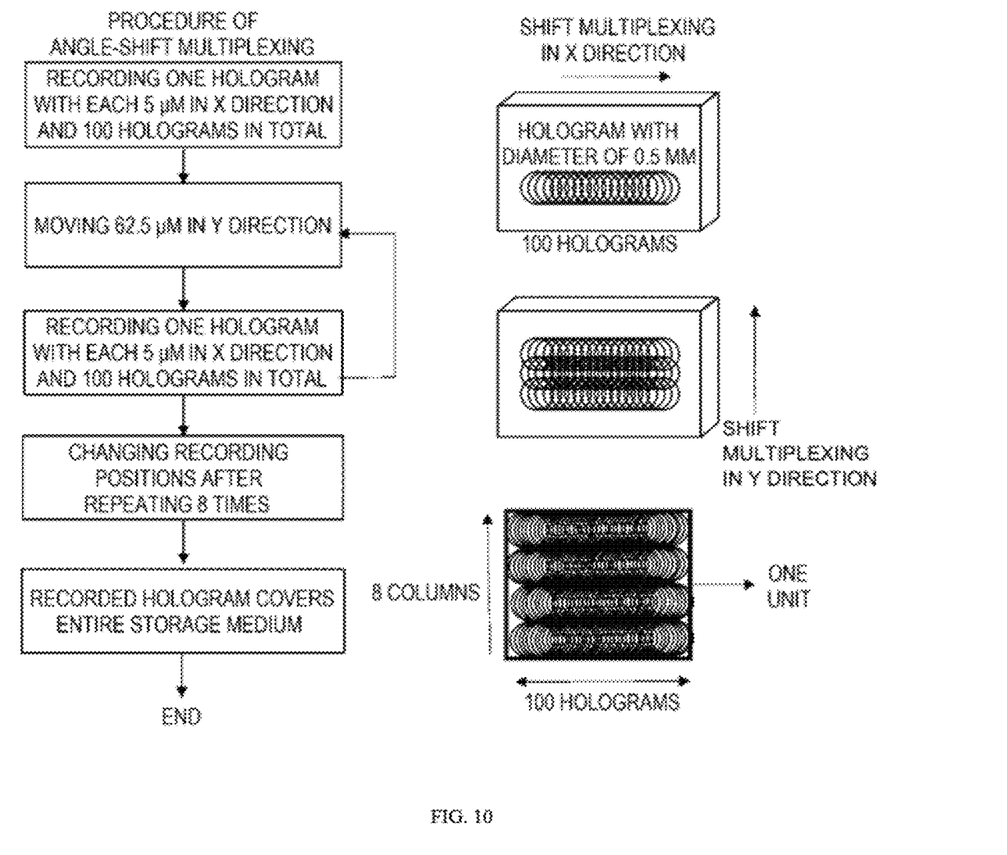
FIG. 10 is a schematic diagram of a holographic multiplex recording procedure.
Figure 11:
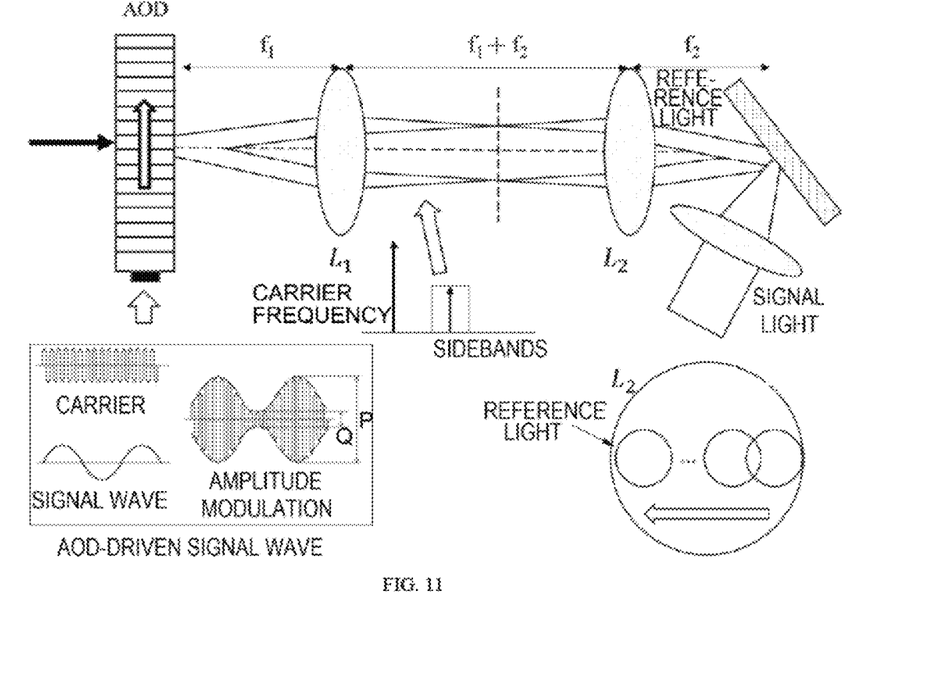
FIG. 11 is a systematic optical path diagram for adjusting the incident angle of the reference light.

The shift multiplexing is performed in a shift direction to obtain multiple hologram sequences superposed with each other, each sequence includes 100 holograms, and the arrangement is shown in FIG. 9. The shift distance of the multiplex recording is 5 microns, and an interval of the first holograms of two adjacent sequences is 500 μm which is the diameter of the hologram, so that even if the incident angles of the reference light used to form the two holograms are the same, crosstalk does not occur since they do not overlap with each other. In a region where the holograms overlap, crosstalk does not occur between the holograms due to a difference in the incident angle of the reference light. Therefore, the hologram recorded by the angle-shift multiplexing method provided by the present patent can be independently reproduced, and the recording procedure of the method is shown in FIG. 10. That is, the size of the unit is 2D×2D=1 mm×1 mm, the storage medium includes a plurality of units superposed with each other in the x direction, and a superposed width is D=0.5 mm.

The patent further provides a method and device for adjusting the incident angle of the reference light. Considering that this patent requires a high-speed angle change function, a method using an acousto-optic modulator (AOM) for the angle change is recommended. The AOM modulates a carrier amplitude, generates a frequency spectrum composed of a carrier wave and sidebands, and generates diffracted light corresponding to the sidebands, that is, a reference beam is generated. Then, the angle can be changed by changing the frequency of an AM signal.

Figure 12:
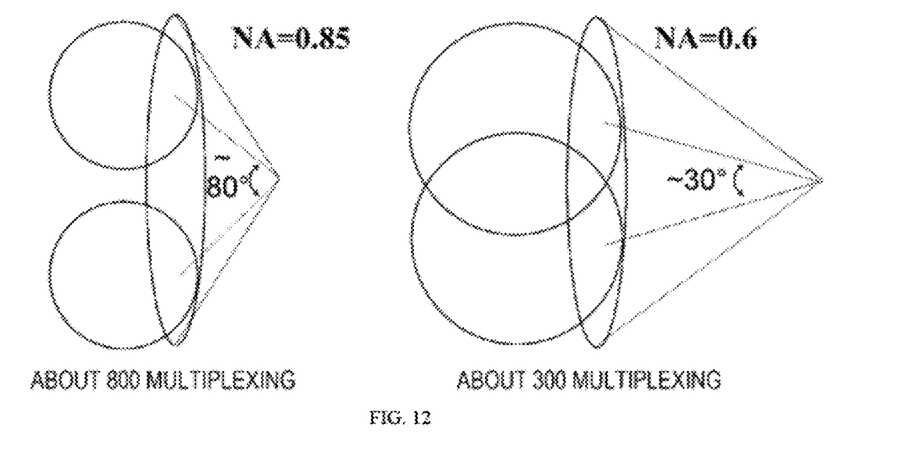
FIG. 12 is a schematic diagram of an estimation method for a multiplexing number in angle multiplex recording.

The frequency spectrum of the sideband is determined by a numerical aperture (NA) of lens L1, which can reach a bandwidth of several tens of MHz. FIG. 12 shows the estimation of the multiplexing number in a method of realizing angle multiplexing by using the AOM. By using an objective lens with NA=0.85, the multiplexing number can reach 800.

Figure 13:
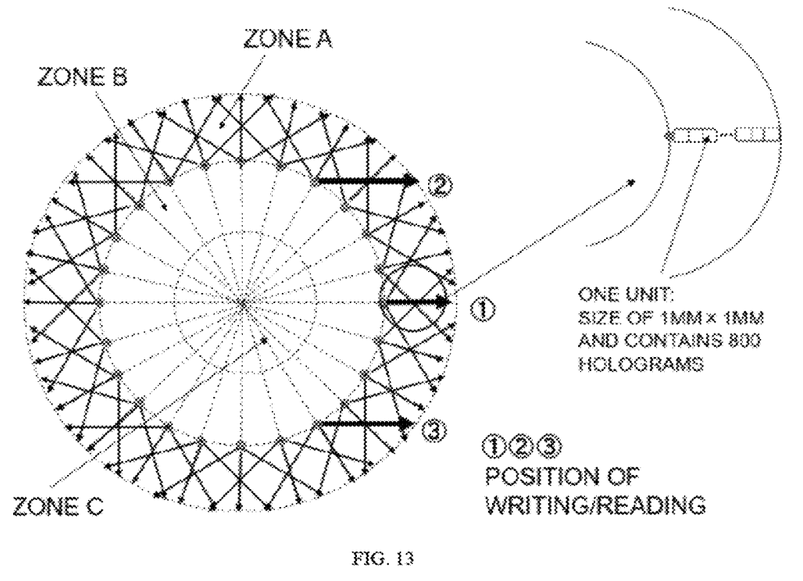
FIG. 13 is a schematic diagram of a cross-shift multiplex recording method in a disk medium.

To further improve recording density of holograms, the present patent proposes a cross-shift multiplexing method. As shown in FIG. 13, guide grooves are provided in the storage medium, and initial position markers are provided in the guide grooves, so that the storage medium takes the markers as start positions, and the shift multiplexing is performed in the right direction along arrows ①, ② and ③ in FIG. 13. The medium is rotated little by little, the initial position markers are positioned after each rotation, and the shift multiplex recording is performed. A crossing angle between a vector direction of recording grating and the shift direction of the storage medium can be changed by changing a relative position between the storage medium and an optical head, and the crossing angle of the hologram sequence obtained through the shift multiplexing at positions ①, ② and ③ can be set to be 50 degrees or more. In this way, six cross-shift multiplexing is possible on the entire surface of the storage medium, that is, the multiplexing number becomes 6 times.

Referring specifically to the right enlarged view in FIG. 13, it can be seen from the drawing that the arrow ① is along a radial direction of a storage ring. This direction is taken as the first x direction positioned as x1. Starting from the inner side of the storage ring, a superposed recording of a plurality of storage units is achieved along the arrow ① direction, the size of each unit is 1 mm×1 mm, the superposed width is 0.5 mm, and each unit includes 100×8 holograms that are arranged in an array of 100×8. The shift step dx=5 μm in an x1 direction, and the shift step dy=62.5 μm in a y1 direction perpendicular to the x1 direction. In the same row, a recording reference light of two adjacent holograms also changes at an equal angle Δθ=0.1 degree, and the starting angles of the reference light of two adjacent rows of hologram sequences differ by 10 degrees.

A next unit row is recorded by the storage ring from the inside to the outside in the arrow ① direction, then a small angle is rotated, and rotation shift multiplexing along the same arrow ① direction at the same start position continues to be performed until the storage ring is fully recorded along the arrow ① direction, that is, rotation of one circle is performed.

Next, the storage medium is moved to the start position of arrow ②. A crossing angle formed by the start positions of the arrow ② and the ① and the center of the circle is 60 degrees. A superposed recording of a plurality of storage units is achieved along the arrow ② direction. The unit row recorded from the inside to the outside by the storage ring along the arrow ② direction and the unit row recorded along the arrow ① direction are cross-multiplexed by an angle of 60 degrees. In the same way, the storage medium is rotated by a small angle, and shift multiplexing along the same arrow ② direction at the same start position continues to be performed until the storage ring is fully recorded along the arrow ② direction, that is, rotation of one circle is performed, and cross multiplexing in the two directions of arrow ② and arrow ① is completed.

Similarly, the cross multiplexing of an arrow ③ and the above-mentioned arrow ②/arrow ① directions can be achieved with a cross-multiplexing crossing angle of 60 degrees, which are repeated six times.

Figure 14:
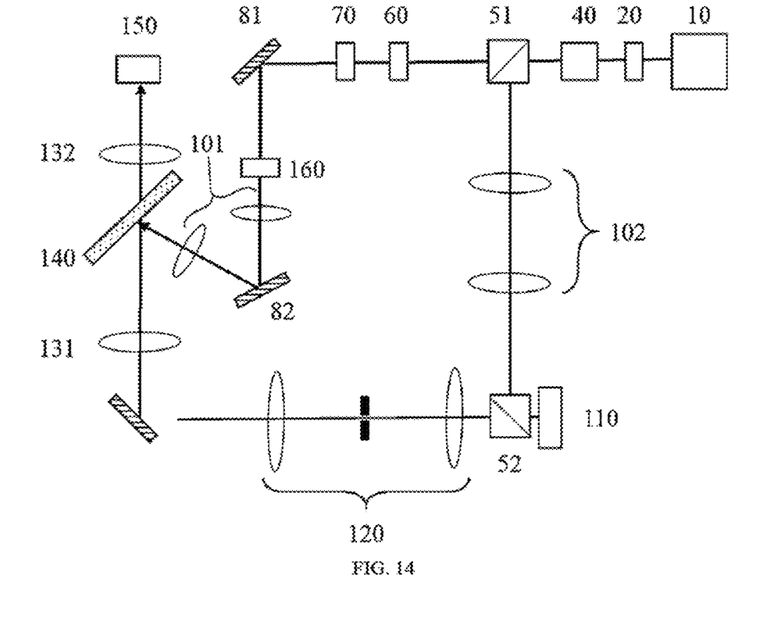
FIG. 14 is a structural diagram of the angle-shift multiplex optical path system based on a grating.

FIG. 14 is an example of angle-shift multiplex system structure proposed by the present patent, which may be implemented in an optical system of conventional angular multiplex recording. As shown in FIG. 14, a holographic storage device based on angle-shift multiplexing includes a laser 10 as light. The light from the laser 10 passes through a shutter 20 and an anamorphic prism group 40 in succession, and is divided by a first polarizing beam splitter 51 into a reference optical path and a signal optical path. The signal light is reflected by a second polarizing beam splitting prism 52 to a spatial light modulator 110 to load signal after passing through a second beam expanding collimator 102, and passes through the second polarizing beam splitting prism 52 again and passes through a relay lens group 120 and a first Fourier lens 131 to reach a holographic disk 140. The reference light is reflected by a first mirror 81 after passing through an attenuator 60 and a half-wave plate 70, then enters an acousto-optic modulator (AOM) 160 or a galvanometer mirror for angular modulation, and then reaches the holographic disk 140 after being expanded and collimated by a collimating structure consisting of a second mirror 82 and a first beam expanding collimator 101. The reference light interferes with the signal light on the holographic disk 140 supported by the medium platform to form holographic storage image information. The acousto-optic modulator (AOM) 160 or the galvanometer mirror is used to control the incident angle of the reference light, so that the incident angle of the reference light is in one-to-one correspondence with the writing position of the reference light on the storage medium.

In addition, a beam splitter composed of a grating and an optical gate switch can be adopted, in which the grating divides the reference light into a plurality of sub-beams that change at the equal angle $\Delta\theta$, and the optical gate switch controls only one sub-beam to illuminate the storage medium for each writing.

Obviously, the above embodiments of the present invention are merely examples for clear illustration of the technical solution in the invention, and are not intended to limit the implementations of the present invention. Any modification, equivalent substitution, improvement, or the like within the spirit and principle of the claims of the invention should be included in the scope of the claims of the invention.

The invention claimed is:

1. A holographic storage method based on angle-shift multiplexing, comprising achieving one-to-one correspondence between an incident angle of a reference light and a position of the reference light, wherein a recording/reproducing position is accessed through translation and rotation of a medium, and a crossing angle of 45 degrees or more is formed between each row of hologram sequence of shift multiplex recording for recording.

2. The holographic storage method based on the angle-shift multiplexing according to claim 1, wherein the incident angles of the reference light are different between overlapping holograms in a recording block.

3. The holographic storage method based on angle-shift multiplexing according to claim 1, wherein a position and a crossing angle of a hologram during cross-shift multiplex recording/reproducing are determined by detecting a marker on a guide groove.

4. The holographic storage method based on angle-shift multiplexing according to claim 3, wherein when the Bragg condition composed of a signal wave vector, a reference wave vector, and a grating vector is broken, it can be corrected by controlling the incident angle and an incident wavelength of the reference light.

5. A holographic storage method based on angle-shift multiplexing, comprising:
achieving one-to-one correspondence between an incident angle of a reference light and a writing position of the reference light on a storage medium in a writing process; and
achieving the one-to-one correspondence by changing the incidence angle of the reference light and the writing position of the reference light on the storage medium at the same time,
wherein the reference light is divided into a plurality of sub-beams changing at an equal angle $\Delta\theta$, and a writing position of a sub-beam on the storage medium changes at an equal distance dx, or the storage medium is moved to cause the writing position of the sub-beam on the storage medium to change at the equal distance dx, only one sub-beam is controlled to illuminate the storage medium for each writing, and dx is a shift step of shift multiplexing.

6. The holographic storage method based on the angle-shift multiplexing according to claim 5, wherein n times of shift multiplexing are performed in an x direction as a shift multiplexing direction to form a row having a size width of 2Rx, m times of shift multiplexing are performed in a y direction perpendicular to the x direction, the shift step is dy, a unit having a size of 2Rx×2Ry is formed, incident angles of the reference light at different writing positions in the unit are different, the size width of holographic image information in the x direction is Rx, the size width of the holographic image information in the y direction is Ry, dx=Rx/n, and dy=Ry/m.

7. The holographic storage method based on the angle-shift multiplexing according to claim 6, wherein unit superposition multiplexing and cross multiplexing are performed in a circular storage medium, units are firstly superposed and multiplexed in the x direction to form unit rows with a superposition width Rx, and then the circular storage medium is rotated and the cross multiplexing of the unit rows is realized.

8. The holographic storage method based on the angle-shift multiplexing according to claim 5, wherein the reference light is divided into a plurality of sub-beams changing at an equal angle $\Delta\theta$, the sub-beams are arranged in a matrix and changed at equal distances dx and dy in two mutually perpendicular x and y directions on the storage medium, or the storage medium is moved to change the sub-beams at equal distances dx and dy in two mutually perpendicular directions on the storage medium, only one sub-beam is controlled to illuminate the storage medium for each writing, and dx and dy are shift steps of shift multiplexing in horizontal and vertical directions respectively.

9. The holographic storage method based on the angle-shift multiplexing according to claim 5, wherein the reference light achieves linear scanning illumination changing at the equal angle $\Delta\theta$ and changing at the equal distance dx on the writing position of the storage medium by using a galvanometer mirror.

10. The holographic storage method based on the angle-shift multiplexing according to claim 5, wherein the reference light achieves matrix scanning illumination changing at the equal angle $\Delta\theta$ and changing at equal distances dx and dy in two mutually perpendicular x and y directions on the storage medium by using a dual galvanometer mirror.

11. The holographic storage method based on the angle-shift multiplexing according to claim 10, wherein when the reference light completes a row of shift multiplex writing in the x direction, the storage medium is moved to cause the writing position of the reference light to return to an initial position in the x direction, a distance of dy is shifted in the y direction, and a new row is written, which are repeated until an entire matrix scanning illumination is completed.

12. A holographic storage device based on angle-shift multiplexing, comprising:
   a light source;
   a reference optical path;
   a signal optical path; and
   a medium platform,
   wherein a light emitted by the light source is divided to form a reference light transmitted along the reference optical path and a signal light transmitted along the signal optical path, the reference light interferes with the signal light on a storage medium supported by the medium platform to form holographic storage image information,
   the holographic storage device based on angle-shift multiplexing further comprising a control mechanism for controlling an incident angle of the reference light and achieving one-to-one correspondence between the incident angle of the reference light and a writing position of the reference light on the storage medium, and
   wherein the control mechanism is a beam splitter dividing the reference light into a plurality of sub-beams that change at an equal angle $\Delta\theta$, and the beam splitter controls only one sub-beam to illuminate the storage medium for each writing.

13. The holographic storage device based on the angle-shift multiplexing according to claim 12, wherein the control mechanism is a beam splitter dividing the reference light into a plurality of sub-beams that change at the equal angle $\Delta\theta$ and are arranged in a matrix, and the beam splitter controls only one sub-beam to illuminate the storage medium for each writing.

14. The holographic storage device based on the angle-shift multiplexing according to claim 12, wherein the control mechanism has a galvanometer-mirror structure that can reflect the reference light at the equal angle $\Delta\theta$ and can control the reference light to scan at an equal distance dx on the storage medium.

15. The holographic storage device based on the angle-shift multiplexing according to claim 14, wherein the control mechanism also includes another galvanometer-mirror structure for achieving shift multiplexing of the reference light in a vertical direction.

16. The holographic storage device based on the angle-shift multiplexing according to claim 12, wherein the medium platform further includes a translation mechanism for driving the storage medium to translate and achieve the shift multiplexing and cross multiplexing, and a rotation mechanism for driving the storage medium to rotate so as to achieve the shift multiplexing.

* * * * *